(12) United States Patent
Tanaka et al.

(10) Patent No.: US 6,608,809 B2
(45) Date of Patent: *Aug. 19, 2003

(54) SEEK OPERATION ON DIFFERENT RECORDING DENSITY REGIONS BASED ON THE REFLECTION OF A BOUNDARY AREA

(75) Inventors: Kei Tanaka, Hamamatsu (JP); Minoru Saito, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,250

(22) Filed: Dec. 1, 1998

(65) Prior Publication Data

US 2001/0053119 A1 Dec. 20, 2001

(30) Foreign Application Priority Data

Dec. 3, 1997 (JP) .............................................. 9-332757

(51) Int. Cl.⁷ .................................................. G11B 7/24
(52) U.S. Cl. ................................ 369/275.3; 369/275.4; 369/44.26; 369/44.28; 369/30.13
(58) Field of Search ................................ 369/32, 275.4, 369/275.3, 59, 58, 47, 54, 13, 275.1, 44.28, 44.26, 44.27, 44.41, 44.23, 53.29, 53.35, 47.32, 30.03, 30.13, 30.11, 30.04, 53.22, 275.2, 53.24

(56) References Cited

U.S. PATENT DOCUMENTS

| | | | | |
|---|---|---|---|---|
| 4,980,882 A | * | 12/1990 | Baer et al. ................. | 369/275.3 |
| 5,027,337 A | * | 6/1991 | Takahashi et al. ....... | 369/44.26 |
| 5,138,599 A | * | 8/1992 | Fukushima et al. ........... | 369/54 |
| 5,345,435 A | * | 9/1994 | Yamasaki ................. | 369/275.3 |
| 5,483,507 A | * | 1/1996 | Ogino .......................... | 369/32 |
| 5,703,842 A | * | 12/1997 | Tonegawa ..................... | 369/32 |
| 5,706,261 A | * | 1/1998 | Udagawa .................. | 369/30.03 |
| 5,732,051 A | * | 3/1998 | Yamaguchi et al. ...... | 369/44.25 |
| 5,796,711 A | * | 8/1998 | Tomita et al. ........... | 369/275.4 |
| 5,841,739 A | * | 11/1998 | Iida et al. ................. | 369/30.13 |
| 5,883,869 A | * | 3/1999 | Tamai et al. ................... | 369/59 |
| 5,896,351 A | * | 4/1999 | Misaizu et al. .......... | 369/30.04 |
| 5,940,364 A | * | 8/1999 | Ogata et al. ............. | 369/275.4 |
| 6,028,829 A | * | 2/2000 | Yamazaki ................. | 369/53.24 |
| 6,038,208 A | * | 3/2000 | Shikunami et al. ...... | 369/275.3 |
| 6,208,602 B1 | * | 3/2001 | Frank ....................... | 369/275.2 |

* cited by examiner

*Primary Examiner*—William Korzuch
*Assistant Examiner*—Kim-Kwok Chu
(74) *Attorney, Agent, or Firm*—Pillsbury Wintrop LLP (57) ABSTRACT

Information recording area of an optical disk is divided radially into a plurality of recording areas with a boundary area interposed therebetween. The boundary area is formed as either a high-reflection area that presents a higher reflection light level than the divided recording areas or a low-reflection area that presents a lower reflection light level than the divided recording areas. When an instruction is given to move an optical head from a current point to the target point over the optical disk, a seek operation is performed up to the start point of one of the divided recording areas that contains the target point, while detecting, on the basis of a variation in the reflection light level, the boundary area located between another one of the divided recording areas that contains the current point and the divided recording area containing the target point. Then, a further seek operation is performed up to the target point by calculating a distance, from the start point of the divided recording area containing the target point, to the target point. With this arrangement, a method is provided which can perform an appropriate seek operation at high speed even on an optical disk that mixedly includes areas of different recording densities.

19 Claims, 10 Drawing Sheets

PRIOR ART

SEEK OPERATION ON DIFFERENT RECORDING DENSITY REGIONS BASED ON THE REFLECTION OF A BOUNDARY AREA

BACKGROUND OF THE INVENTION

The present invention relates generally to optical disks such as CDs (Compact Discs) and DVDs (Digital Versatile Discs), and more particularly to an improved seek control method and device which are useful for a high-speed search for a designated target point on an optical disk that mixedly includes a plurality of areas of different recording densities.

Figure 9:
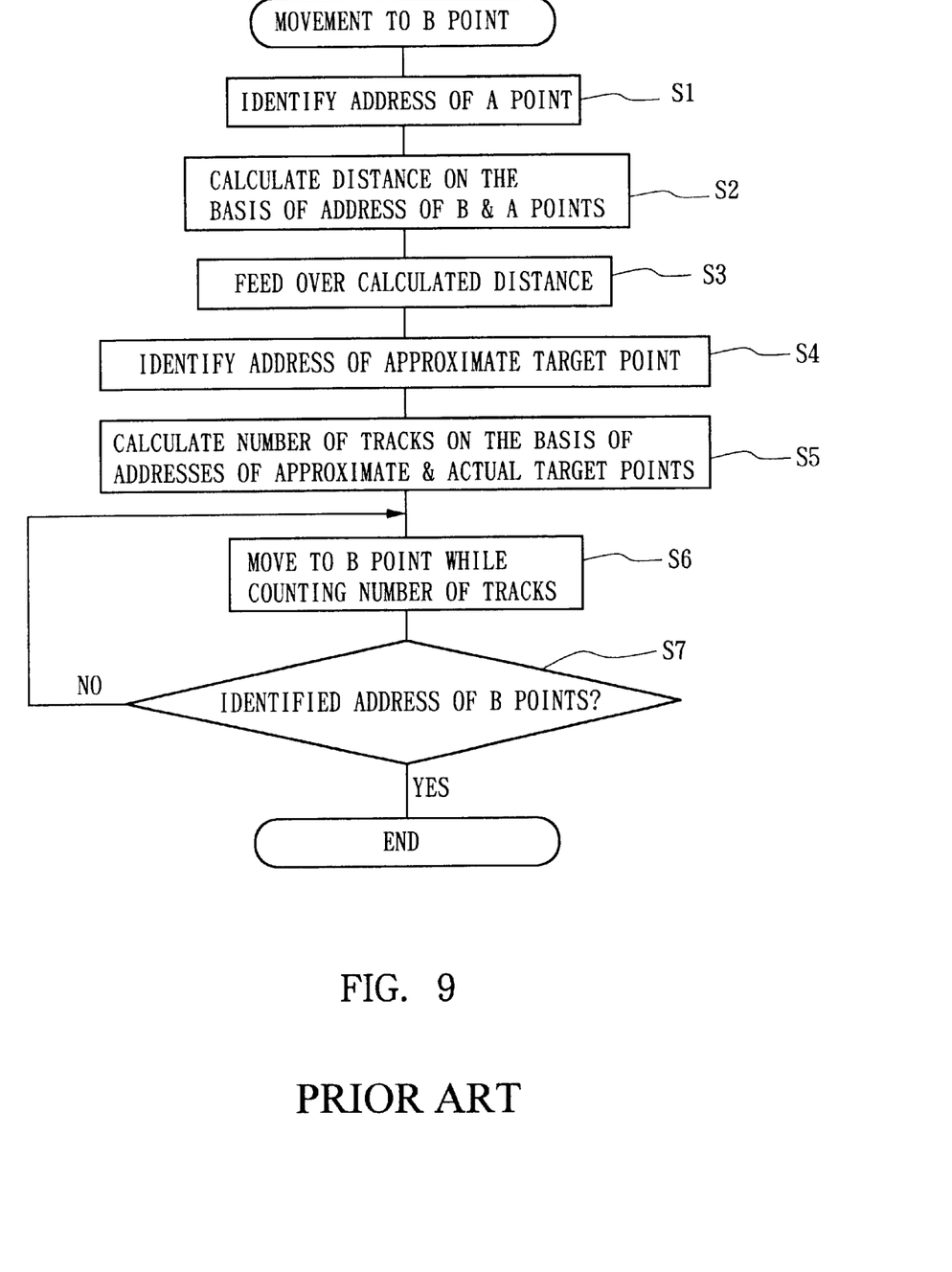
FIG. 9 is a flow chart illustrating a seek operation conventionally performed in a known optical disk drive device.

In optical disk drive devices, a so-called "seek" operation, as flowcharted in FIG. 9, has been performed conventionally in order to position or seek an optical head at a designated target point. Namely, in response to an instruction to move the optical head from an original or current point (A point) to a target point (B point), the address (expressed in absolute time) of the A point is identified at step S1. Then, a distance the optical head should move is calculated from the addresses of the B and A points at step S2, and the optical head is fed, on the basis of outputs from a linear encoder, to an approximate target point (i.e., a point in the vicinity of the actual target point) at step S3. Once the optical head has been fed up to the approximate target point, the address of the approximate target point is identified at step S4. Then, a specific number of tracks to be crossed by the optical head is calculated at step S5 from the identified address of the approximate target point and the address of the B point. After that, the optical head is further moved to the B point while counting the calculated number of tracks at step S6. Then, at next step S7, the seek operation is terminated upon detecting that the address of the B point has been reached.

However, such a conventional seek operation is disadvantageous in that it would take a long time to search for a designated target point, due to the arrangement that the head feeding operation is initiated only after the distance between the current and target points is calculated on the basis of their respective addresses and the travelling speed of the optical head is limited to a countable range or operating capability of the linear encoder even where the head is to travel or to be fed over a long distance.

Figure 10A:
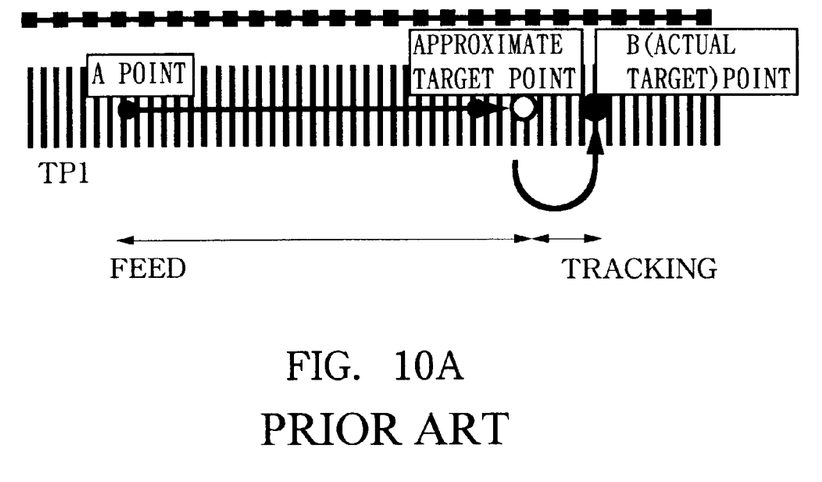
FIG. 10 is a flow chart illustrating the conventional seek operation.
Figure 10B:
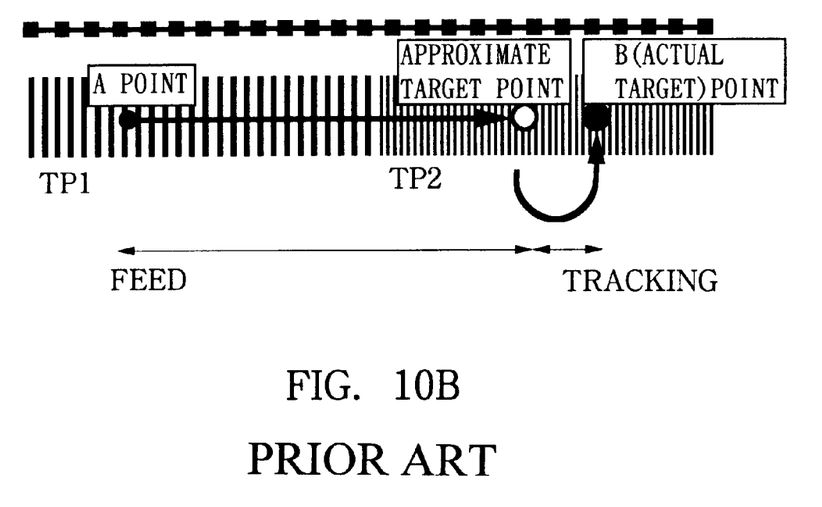
Figure 11A:
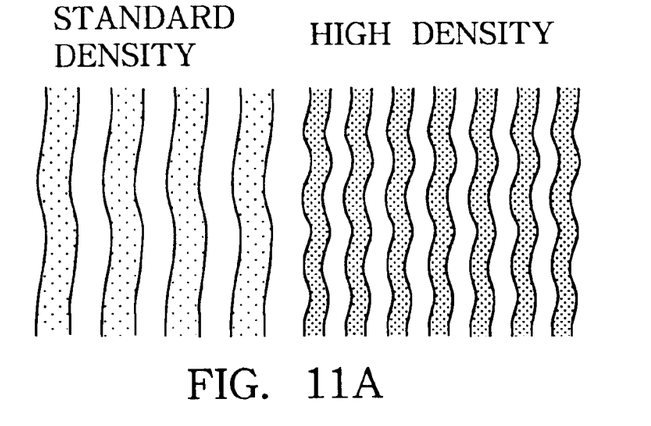
FIGS. 11A and 11B are diagram explanatory of an optical disk that mixedly includes recording areas of different recording densities.
Figure 11B:
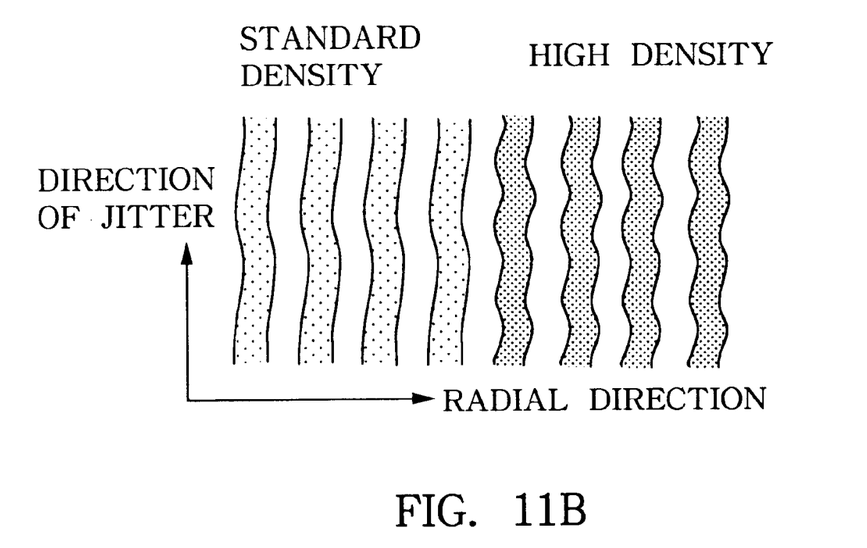

Further, whereas the above-mentioned track seek operation achieves a relatively satisfactory result where the track pitch TP is uniform throughout the optical disk as illustrated in FIG. 10A, it is unable to work satisfactorily where the optical disk mixedly includes recording areas of different recording densities such that variation occurs from one pitch TP1 to another pitch P2 as illustrated in FIG. 10B; this is because a difference between addresses of two points can not always be in a simple linear relationship with a distance to be travelled by the optical head. Such a problem would arise not only in the case where the track pitch varies, but also in the case where the recording density varies in both the radial direction of the disk and the direction of jitters as shown in FIG. 11A or where the recording density varies only in the direction of jitters as illustrated in FIG. 11B.

SUMMARY OF THE INVENTION

It is therefore a first object of the present invention to provide a seek control method and device for an optical disk which permit a high-speed seek operation of an optical head over the optical disk.

It is a second object of the present invention to provide a seek control method and device for an optical disk which can perform an appropriate seek operation even on an optical disk mixedly including a plurality of areas of different recording densities.

In order to accomplish the above-mentioned objects, the present invention provides a seek control method for an optical disk, which comprises the steps of: dividing an information recording area of the optical disk radially into a plurality of recording areas with a boundary area interposed therebetween, the boundary area being either a high-reflection area that presents a higher reflection light level than the divided recording areas or a low-reflection area that presents a lower reflection light level than the divided recording areas: calculating a distance, from a start point of one of the divided recording areas that contains a designated target point, to the designated target point, when an instruction is given to move an optical head from a current point to the target point over the optical disk; performing a seek operation up to the start point of the divided recording area containing the target point by detecting, on the basis of a variation in the reflection light level, the boundary area located between another one of the divided recording areas that contains the current point and the divided recording area containing the target point; and further performing a seek operation up to the target point on the basis of the distance calculated by the step of calculating.

The present invention also provides a seek control device for an optical disk having an information recording area of the optical disk divided radially into a plurality of recording areas with a boundary area interposed therebetween, the boundary area being either a high-reflection area that presents a higher reflection light level than the divided recording areas or a low-reflection area that presents a lower reflection light level than the divided recording areas, which comprises: an optical head that irradiates a light beam onto the optical disk and detects reflection light from the optical disk; a distance calculating section that calculates a distance, from a start point of one of the divided recording areas that contains a designated target point, to the designated target point, when an optical head is to be moved from a current point to the target point over the optical disk; a boundary signal detector section that detects a boundary signal indicative of the boundary area on the basis of a varying output level of the optical head as the optical head is moved from the current point to the target point; and a servo control section that detects the start point of the divided recording area containing the target point on the basis of detection by the boundary signal detector section and drives the optical head up to the target point on the basis of the distance calculated by the distance calculating section.

The present invention is characterized primarily in that random access is made to the start point of any one of the divided recording areas on the optical disk, by detecting the boundary area on the basis of a level of reflected light therefrom which is chosen to significantly differ from levels of reflected light from the divided recording areas. Thus, if one of the divided recording areas where a designated target point is contained (i.e., a target area) is known, the seek control could be effected properly by just determining a specific number of the boundary areas that are to be crossed, by the optical pickup or head, before the designated target point is reached. With this characteristic arrangement, the present invention allows the seek operation to be initiated immediately without having to calculate a difference between addresses of the target point and an original or current point. Further, the optical head can be moved to the start point of the target area at high speed, because there would occur no substantial limit to the travelling speed of the head, due to the limited operating capability of the linear encoder, before the start point of the target area is reached. Moreover, because the distance between the start point of the target area and the designated target point can be calculated during the seek to the target area start point, the necessary search time can be reduced to a significant degree.

In the seek operation, such as by the servo control section, a position detector is used for a region from the start point of the divided recording area containing the target point to a given point in the vicinity of the target point (i.e., an approximate target point) and then a track counter is used for a region from the approximate target point to the actual target point. In this case, during the calculation of the distance from the current point to the target point, variable control settings for use in the seek control device are adjusted on the basis of recording density information contained in area information. Thus, even where the areas on the optical disk have different recording densities, the recorded information can be read out as soon as the optical head reaches the target area, and it is possible to eliminate the need for pre-gap portions at the beginning of the individual recording areas and also to reduce the necessary search time.

Further, the random access to the start point of the target area does not depend on the recording density at all; what depends on the recording density is the seek operation performed for the region from the start point of the target area to the target point. Because such a seek operation takes place within a same recording area, there would occur no recording density variation. Thus, even where the recording density differs between the individual areas, the distance between the start point of the target area and the designated target point can be calculated with ease on the basis of the recording densities as long as the respective recording densities of the individual areas are known. As a consequence, the present invention can perform an appropriate seek operation even on such an optical disk that mixedly includes various areas of different recording densities.

BRIEF DESCRIPTION OF THE DRAWINGS

For better understanding of the above and other features of the present invention, preferred embodiments of the invention will hereinafter be described in greater detail with reference to the accompanying drawings, in which.

DETAILED DESCRIPTION OF THE PREFERRED EMBODIMENTS

Figure 1:
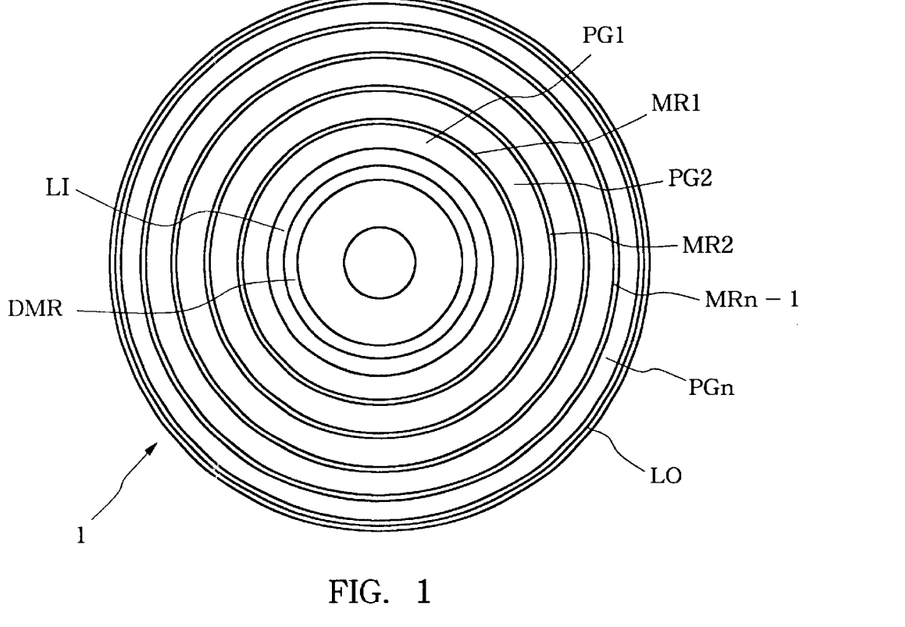
FIG. 1 is a plan view showing a recording format of an optical disk in accordance with an embodiment of the present invention.
Figure 2:
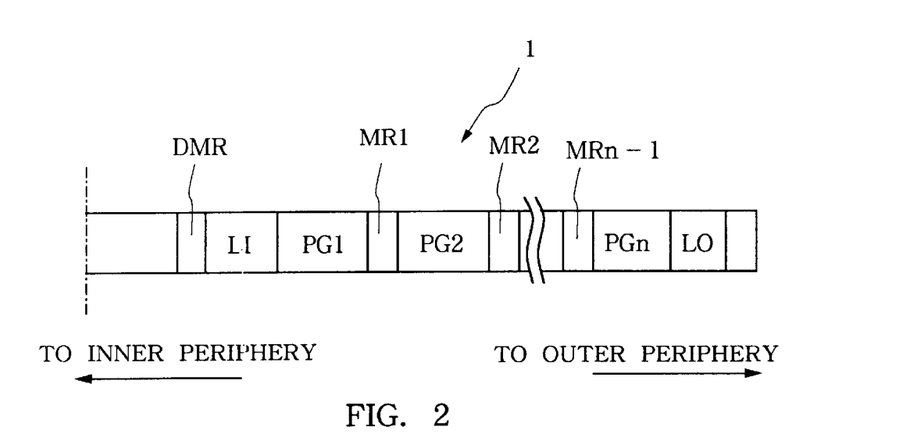
FIG. 2 is a partly-sectional view of the optical disk shown in FIG. 1.

FIG. 1 is a plan view showing a recording format of an optical disk in accordance with an embodiment of the present invention, and FIG. 2 is a partly-sectional schematic view of the optical disk.

Figure 3:
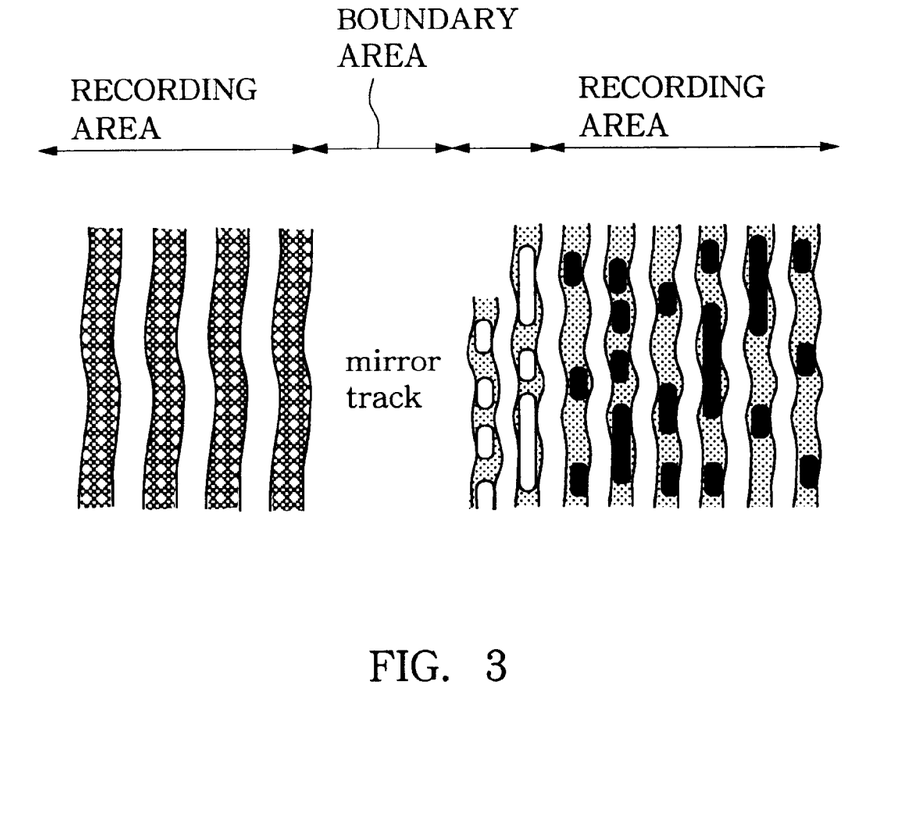
FIG. 3 is an enlarged view of divided recording areas of the optical disk.

The optical disk 1 includes, in an innermost-to-outermost direction, a decorative mirror portion DMR, a lead-in area LI, a first recording area PG1, a first boundary area MR1, a second recording area PG2, a second boundary area MR2, . . . , an (n−1)th boundary area MRn−1, an nth recording area PGn and a lead-out area L0. Each of the boundary areas MR between the recording areas PG is formed as a high-reflection mirror area so that reflected light from the boundary area MR is greater in level than that from the other areas as shown in FIG. 3. The divided recording areas in the illustrated example have different recording densities, although they may have a uniform recording density according to the present invention. In the illustrated example, a pre-gap portion may be provided immediately before each of the divided recording areas, as shown in FIG. 3, so that various servo parameters can be adjusted by use of the pre-gap portions.

Figure 4:
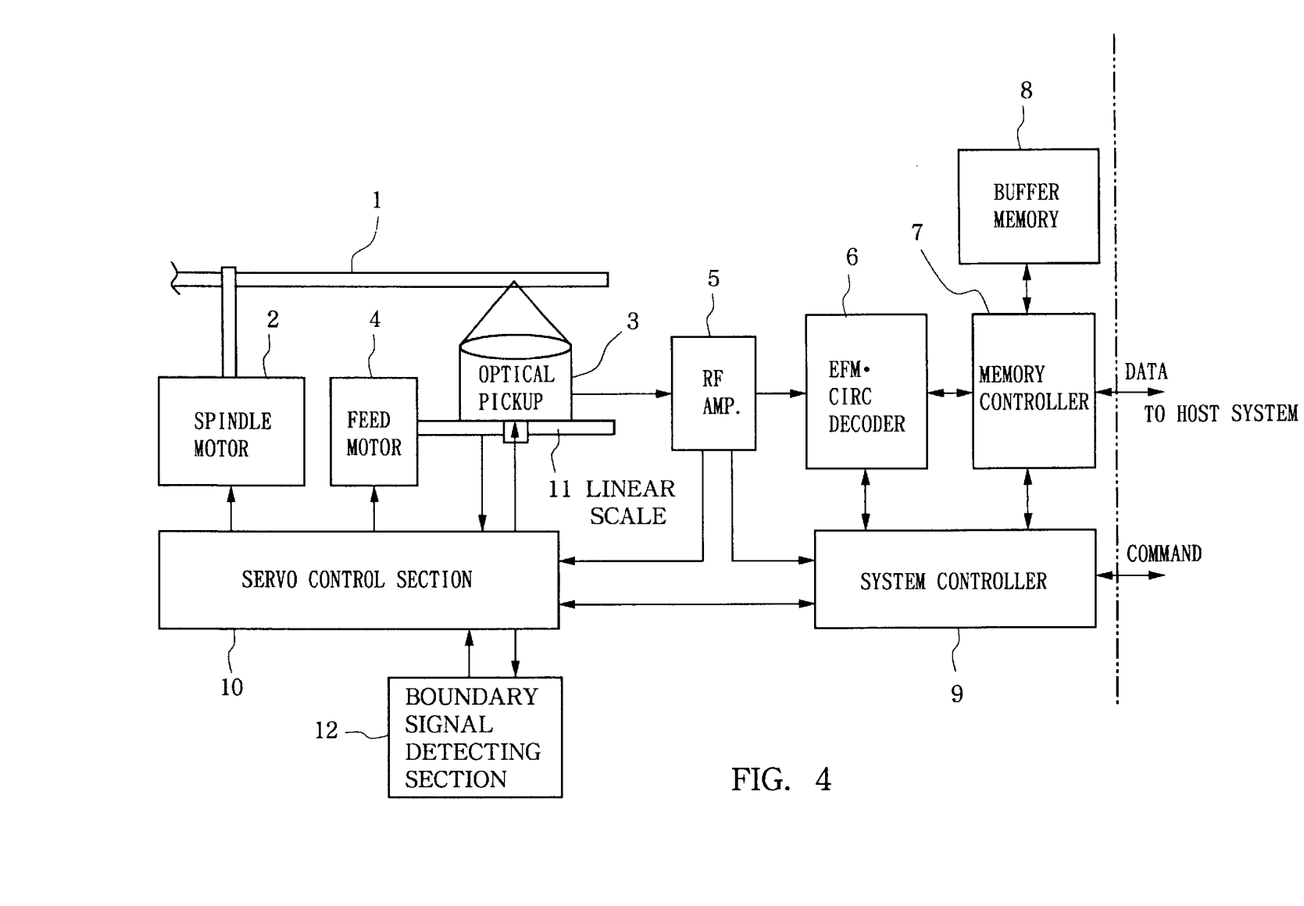
FIG. 4 is a block diagram showing an exemplary hardware setup of an optical disk drive device to which is applied a seek control method of the present invention.

FIG. 4 is a block diagram showing an exemplary hardware setup of an optical disk drive device for such an optical disk, to which is applied a seek control method of the present invention. Although the optical disk drive device is shown and described here as being capable of only reading recorded data from the optical disk, it should be obvious that the principle of the invention is also applicable to an optical disk drive device capable of both recording and reading data on the optical disk.

The optical disk drive device includes a spindle motor 2 that drives the optical disk 1 to rotate, typically, at constant linear velocity. Optical pickup 3, functioning as an optical head, is disposed in opposed relation to the recording surface of the optical disk 1. The optical pickup 3 is controllably driven by a feed motor 4 to move in the radial direction of the optical disk 1. Output (read-out) data from the optical pickup 3 are each amplified via an RF (high-frequency) amplifier 5 and then passed to an EFM/CIRC (Cross Interleaved Reed-Solomon Code) decoder 6 that performs EFM-demodulating and CIRC-decoding operations on the read-out data. The data demodulated and decoded by the decoder 6 is temporarily stored into a buffer memory 8 under the control of a memory controller 7 if the read-out data is recorded data on the optical disk 1, or is sent to a system controller 9 if the read-out data is control information. The data temporarily stored in the buffer memory 8 are sequentially read out therefrom under the control of the memory controller 7 and then output to a host system (not shown) or the like. Servo control section 10 executes focusing and tracking control of the optical pickup 3 on the basis of the output from the RF amplifier 5 and also controls the spindle motor 2 in accordance with instructions given from the system controller 9. Also, in accordance with instructions from the system controller 9, the servo control section 10 controls the feed motor 4 on the basis of outputs from a linear scale 11 and a boundary signal detecting section 12, functioning as position detector means, so as to control the seek operation of the optical pickup 3.

Figure 5:
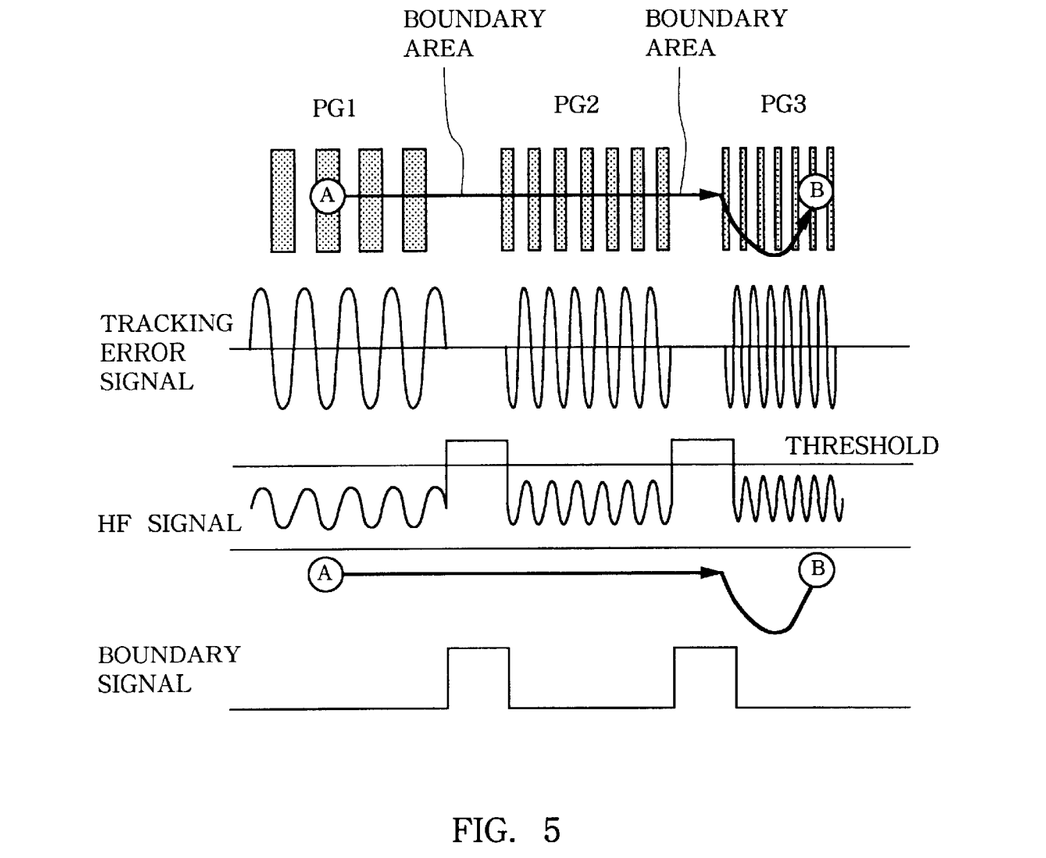
FIG. 5 is a waveform diagram of various signals detected in various parts of the optical disk drive device of FIG. 4.

The following paragraphs describe details of the boundary signal detecting section 12. The optical disk 1 is divided into a plurality of recording areas of different recording densities with the high-reflection or mirror portion disposed in the boundary between the recording areas, as shown in FIG. 5. Thus, as a seek operation is performed to move the optical pickup 3, for example, from an "A" point contained in the first recording area PG1 to a "B" point contained in the third recording area PG3 that has a different recording density from that of the first recording area PG1, a tracking error signal from the optical pickup 3 presents different cyclic times or periods in the individual areas as shown, and a high-frequency signal output from the RF amplifier 5 presents a highest level in the boundary areas. The boundary signal detecting section 12 detects the highest level of the high-frequency signal by use of a predetermined threshold level and provides the detected level as a boundary signal.

Figure 6:
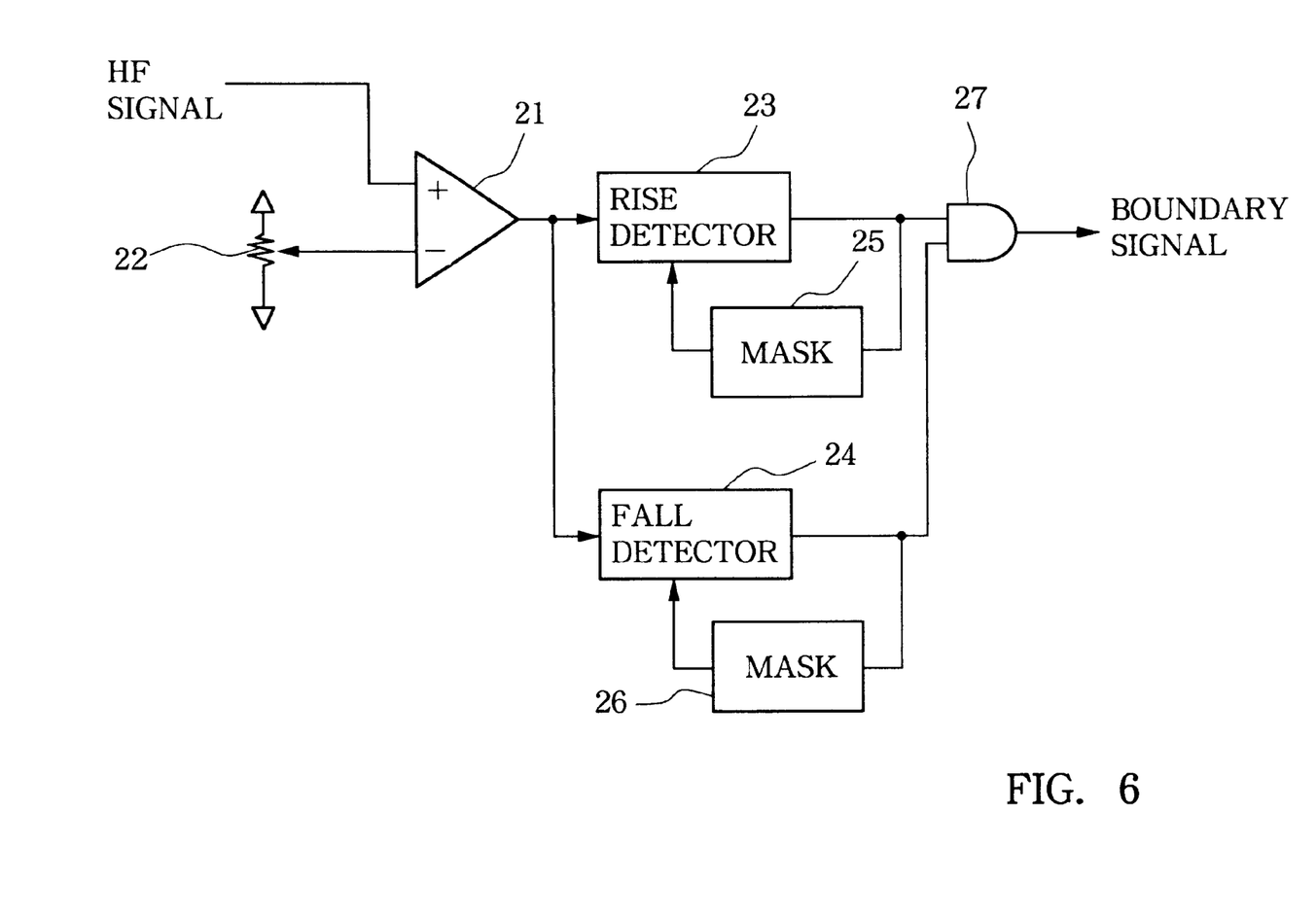
FIG. 6 is a block diagram showing a detailed circuit structure of a boundary signal detecting section in the optical disk drive device.

FIG. 6 is a block diagram showing a detailed circuit structure of the boundary signal detecting section 12. The high-frequency signal from the RF amplifier 5 is first input to a comparator 21, where it is compared with the threshold level given from a threshold level setting section 22 and the boundary signal indicative of detection of one of the boundary areas is generated when the high-frequency signal is greater than the threshold level. The boundary signal output from the comparator 21 may contain noise at its rising and falling edge segments. To eliminate the influences of the noise, a rise detector section 23 and fall detector section 24 detects the rising and falling edges, respectively, of the boundary signal, and masking sections 25 and 26 mask respective parts of the boundary signal for predetermined periods from the detection of the rising and falling edges; in the illustrated example, the predetermined periods are adjustable as may be necessary. Thus, the embodiment presumes that a boundary signal has been actually detected only when the high level of the masked signal has lasted for more than a predetermined time period. With this arrangement, the embodiment can effectively eliminate the influences of the noise. AND gate 27 performs an AND operation between detection signals of the rising and falling edges output from the detector sections 23 and 24, to thereby provide an actual or noise-free boundary signal.

Whereas the boundary areas in the embodiment have been described above as total-reflection areas, they may be non-reflective areas, in which case the comparator 21 is arranged to detect reflection light lower in level than that of the other areas.

Figure 7:
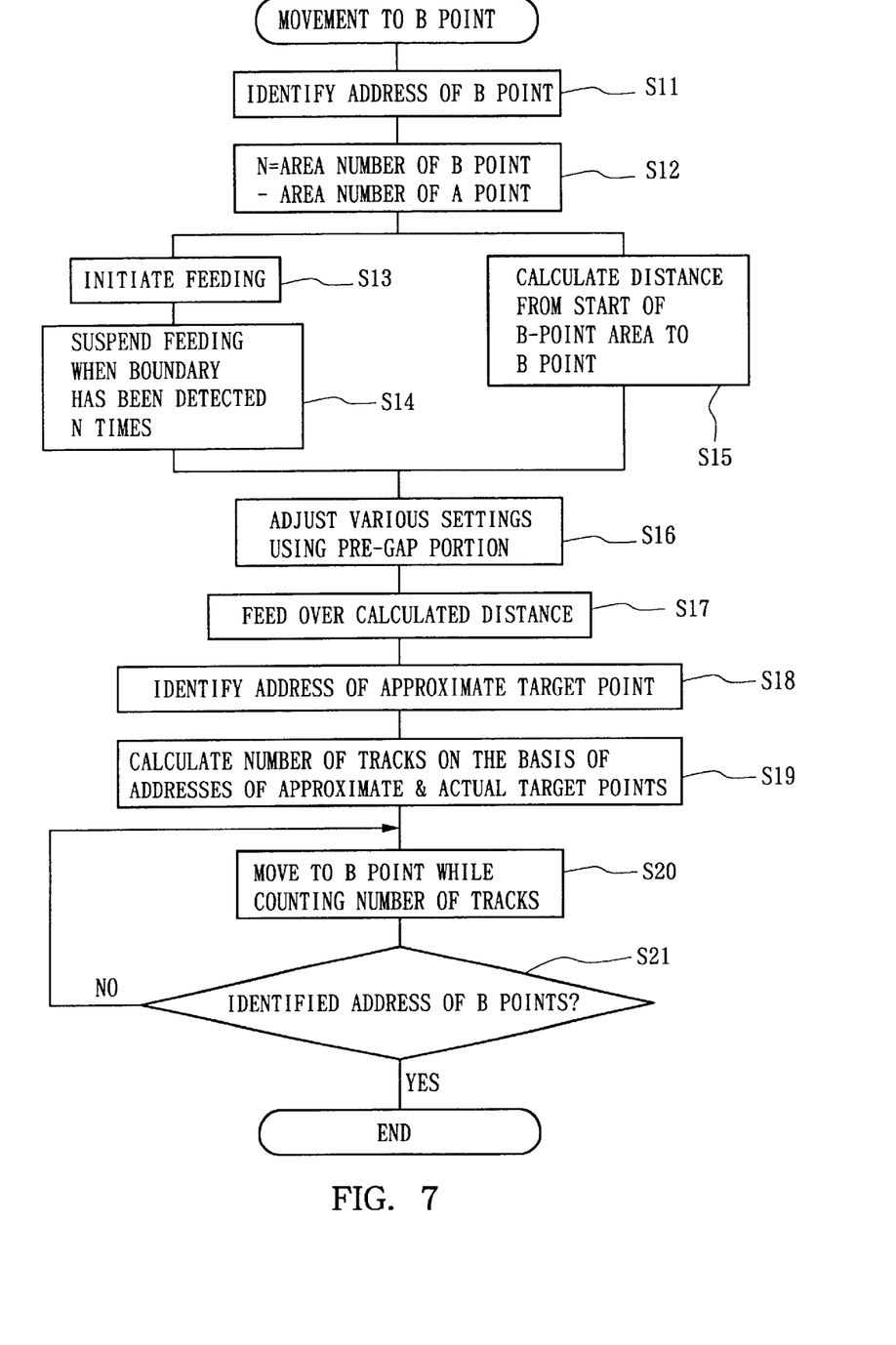
FIG. 7 is a flow chart illustrating a seek operation performed in the optical disk drive device.

FIG. 7 is a flow chart of the seek operation performed in the optical disk drive device.

In response to an instruction to move the optical pickup to the B or target point of the third recording area PG3, the system controller 9 first identifies the address of the A or current point of the first recording area PG1 on the basis of a Q-channel subcode frame recorded on the optical disk 1, at step S11. At this time, it is necessary that an identification number or other identification information indicative of the area containing the A point be recorded in a predetermined place within the subcode frame, or that a relationship between the absolute address of the A point and the area containing the A point be included in TOC (Table-Of-Contents) information recorded in the lead-in area LI; with such an arrangement, area information relating to the A point can also be automatically acquired as the address of the A point is identified. If the area numbers are used as be a highest-order directory, there is no need to allocate a series of addresses throughout the optical disk; in stead, a fewer number of addresses, starting with 00 MIN (minute):00 SEC (second): 00 FRAME (frame), may be allocated to each of the areas.

Similarly, the address of the B point may be identified from the TOC information along with the area information. Then, a difference N is calculated at step S12 by subtracting the area number of the A point from the area number of the B point; the difference N represents a specific number of pulses of the boundary signal that are to be detected during the movement, from the A point to the B point, of the optical pickup 3. If the calculated difference N is zero (N=0), it means that the seek operation is to be effected within a same recording area, and thus it is only necessary that a operational flow as in the conventional seek operation be carried out. If the calculated difference N is not zero, an operation for feeding the optical pickup (feed operation) is initiated at step S13 and continued until the boundary signal detector section 12 detects the boundary signal N times at step S14. Concurrently with the feed operation, a distance from the start point of the area containing the B point (i.e., target area) to the B point over which the optical pickup should move is calculated at step S15. Because respective recording densities (track pitches or linear recording densities) of the individual areas are previously contained in the TOC information or previously acquired or known by a pre-search through the individual areas, the distance, from the start point of the area containing the B point (target area) to the B point, to be covered by the optical pickup can be calculated on the basis of the recording density information. Once the boundary signal has been detected N times, the feed operation is suspended (at step S14), to thereby complete random access to the start point of the area containing the B point.

Then, servo parameters are adjusted at step S16 using a period corresponding to the pre-gap portion located immediately before the accessed start point of the area, and the optical pickup is fed over the calculated distance up to an approximate target point at step S17. After that, the address of the approximate target point (in the vicinity of the actual target point B) is identified at step S18, and a specific number of tracks to be crossed by the optical pickup 3 is calculated at step S19 from the identified address of the approximate target point and the address of the B point. At next step S20, the optical pickup 3 is further moved to the B point while counting the calculated number of tracks. Subsequently, at next step S21, the seek operation is terminated upon detecting that the address of the B point has been reached.

The seek control method thus arranged permits instantaneous random access to the start point of any one of the areas on the optical disk I and allows the conventional seek operation flow to be applied to control of the optical pickup movement from the start point of a selected one of the areas to a designated target point.

Figure 8:
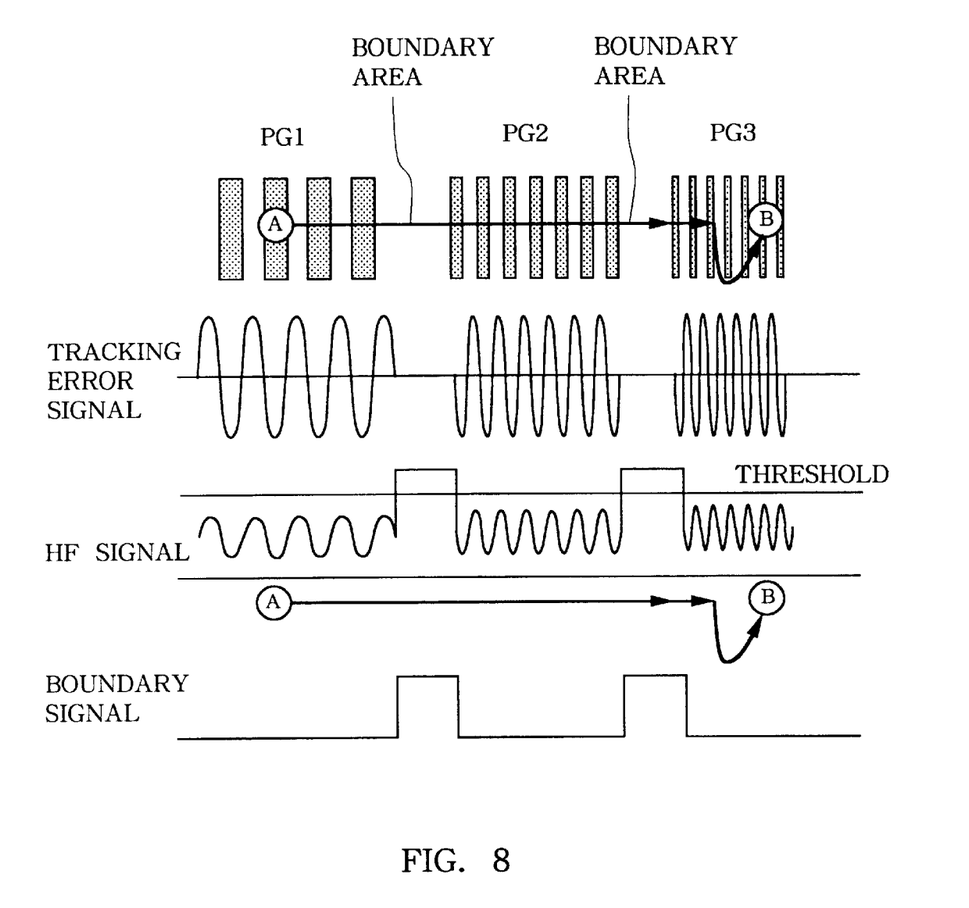
FIG. 8 is a diagram explanatory of another example of the seek operation performed in the optical disk drive device.

After random access is made to the start point of a selected one of the areas, one form of seek operation using a linear encoder may be performed for a region from the area's start point to the approximate target point, and then another form of seek operation using a track counter may be performed for another region from the approximate target point to the actual target point, as illustrated in FIG. 8. In this case, during the calculation of the distance from the A point to the B point at step S15, variable control settings, such as servo parameters, NA (Numerical Aperture) and laser wavelength, are adjusted on the basis of recording density information contained in the area information. By so doing, the recorded information can be read out the as soon as the optical pickup reaches a target area, and it is possible to eliminate the need for the pre-gap portions at the beginning of the individual areas and also to reduce a necessary search time.

Whereas the TOC information for the individual areas has been described above as being recorded collectively in a single lead-in area LI, lead-in and lead-out areas may alternatively be provided at the beginning and end, respectively, of each of the recording areas.

In summary, the present invention having been described so far is characterized primarily in that random access is made to the start point of any one of the divided recording areas on the optical disk, by detecting the areas on the basis of different levels of reflected light from the individual areas. With this characteristic arrangement, the present invention allows the seek operation to be initiated immediately without having to calculate a difference between addresses of a target point and a current point. Further, the optical head can be moved to the start point of a target area at high speed, because there would occur no limit to the travelling speed of the pickup, due to the limited operating capability of the linear encoder, before the start point of the target area is reached. As a consequence, the necessary search time can be reduced to a significant degree.

Further, because the random access to the target area does not depend on the recording density at all, the present invention can perform an appropriate seek operation even on an optical disk that mixedly includes various areas of different recording densities.

What is claimed is:

1. A seek control method for an optical disk comprising the steps of:
   providing an information recording area of the optical disk radially divided into a plurality of recording areas, with a boundary area, having a width and no data recorded therein, interposed therebetween, the boundary area being either a high-reflection area that presents a higher reflection light level than that of the recording areas or a low-reflection area that presents a lower reflection light level than that of the recording areas;
   calculating a distance, from a start point, of one of the recording areas that contains a designated target point, to the designated target point, when an instruction is given to move an optical head from a current point to the target point over the optical disk;
   performing a seek operation, up to the start point of the recording area containing the target point, by detecting, based on either a higher reflection level or a lower reflection level than that of the recording areas, the boundary area located between the one of the recording areas containing the current point and the recording area containing the target point; and
   further performing a seek operation up to the target point based on the distance calculated by said step of calculating.

2. A seek control method as recited in claim 1 wherein in said step of further performing a seek operation up to the target point, the seek operation is performed using a position detector for a region from the start point of the divided recording area containing the target point to a given point in the vicinity of the target point and then using a track counter for a region from the given point in the vicinity of the target point to the target point.

3. The seek control method of claim 1, wherein each boundary area is comprised of a mirror portion.

4. The seek control method of claim 1, wherein data discrimination occurs only when data is read from the recording area containing the target point.

5. A seek control method for an optical disk comprising the steps of:
   providing an information recording area of the optical disk radially divided into a plurality of recording areas, with a boundary area, having a width and no data recorded therein, interposed therebetween, the boundary area being either a high-reflection area that presents a higher reflection light level than that of the recording areas or a low-reflection area that presents a lower reflection light level than that of the recording areas;
   calculating a distance, from a start point, of one of the recording areas that contains a designated target point, to the designated target point, when an instruction is given to move an optical head from a current point to the target point over the optical disk;
   performing a seek operation, up to the start point of the recording area containing the target point, by detecting, based on either a higher reflection level or a lower reflection level than that of the recording areas, the boundary area located between the one of the recording areas containing the current point and the recording area containing the target point; and
   further performing a seek operation up to the target point based on the distance calculated by said step of calculating,
   wherein information is recorded in the recording areas of the optical disk with recording density differing between the recorded areas, and the distance, from the start point of the recording area containing the target point, to the target point is calculated based on a variation in the recording density.

6. A seek control device for an optical disk, an information recording area of the optical disk being divided radially into a plurality of recording areas, with a boundary area, having a width and no data recorded therein, interposed therebetween, the boundary area being either a high-reflection area that presents a higher reflection light level than that of the recording areas or a low-reflection area that presents a lower reflection light level than that of the recording areas, said seek control device comprising:
   an optical head that irradiates a light beam onto the optical disk and detects reflection light from the optical disk;
   a distance calculating section that calculates a distance, from a start point, of one of the recording areas that contains a designated target point, to the designated target point, when an optical head is to be moved from a current point to the target point over the optical disk;
   a boundary signal detector section that detects a boundary signal indicative of the boundary area based on a varying output level of said optical head as said optical head is moved from the current point to the target point; and
   a servo control section that detects the start point, of the recording area containing the target point, based on detection by said boundary signal detector section and drives said optical head up to the target point based on the distance calculated by said distance calculating section,
   wherein information is recorded in the recording areas of the optical disk with recording density differing between the recorded areas, and said servo control section calculates the distance, from the start point of the recording area containing the target point, to the target point based on a variation in the recording density.

7. A seek control device for an optical disk, an information recording area of the optical disk being divided radially into a plurality of recording areas, with a boundary area, having a width and no data recorded therein, interposed therebetween, the boundary area being either a high-reflection area that presents a higher reflection light level than that of the recording areas or a low-reflection area that presents a lower reflection light level than that of the recording areas, said seek control device comprising:

an optical head that irradiates a light beam onto the optical disk and detects reflection light from the optical disk;

a distance calculating section that calculates a distance, from a start point, of one of the recording areas that contains a designated target point, to the designated target point, when an optical head is to be moved from a current point to the target point over the optical disk;

a boundary signal detector section that detects a boundary signal indicative of the boundary area based on a varying output level of said optical head as said optical head is moved from the current point to the target point; and a servo control section that detects the start point of the recording area containing the target point based on detection by said boundary signal detector section and drives said optical head up to the target point based on the distance calculated by said distance calculating section.

8. A seek control device as recited in claim 7 wherein said servo control section performs a seek operation using a position detector for a region from the start point of the divided recording area containing the target point to a given point in the vicinity of the target point and then using a track counter for a region from the given point in the vicinity of the target point to the target point.

9. The seek control method of claim 7, wherein each boundary area is comprised of a mirror portion.

10. The seek control method of claim 7, wherein data discrimination occurs only when data is read from the recording area containing the target point.

11. A recording medium for an optical disk, the recording medium comprising:

an information recording area divided radially into a plurality of recording areas, with a boundary area, having a width and no data recorded therein, interposed between each recording area, each boundary area being comprised of a high reflection area to reflect a first reflection light level, all of which is larger than a predetermined threshold level, wherein each of the recording areas reflect a second reflection light level, all of which is lower than the predetermined threshold level, and the recording areas have a plurality of addressable storage locations in which information is recorded, and each boundary area is detectable by a light beam utilized to detect the recording areas.

12. The recording medium of claim 11, wherein each boundary area is comprised of a mirror portion.

13. The recording medium of claim 11, wherein the recording areas are comprised of at least one recording density.

14. The recording medium of claim 11, wherein at least one of the boundary areas is comprised of a high-reflection area that presents a higher reflection light level than the divided recording areas.

15. The recording medium of claim 11, wherein at least one of the boundary areas is comprised of a low-reflection area that presents a lower reflection light level than the divided recording areas.

16. The recording medium according to claim 11, wherein each boundary area has a different recording density than the recording areas.

17. The recording medium according to claim 11, wherein the first reflection light level is sufficient to indicate a presence of the boundary area during a seek operation.

18. A recording medium for an optical disk, the recording medium comprising:

an information recording area divided radially into a plurality of recording areas, with a boundary area, having a width and no data recorded therein, interposed between each recording area, each boundary area being comprised of a low reflection area to reflect a first reflection light level, all of which is lower than a predetermined threshold level, wherein each of the recording areas reflect a second reflection light level, all of which is greater than the predetermined threshold level, and the recording areas have a plurality of addressable storage locations in which information is recorded, and each boundary area is detectable by a light beam utilized to detect the recording areas.

19. The recording medium according to claim 18, wherein the first reflection light level is sufficient to indicate a presence of the boundary area during a seek operation.

* * * * *